(12) United States Patent
Inoue et al.

(10) Patent No.: US 8,510,011 B2
(45) Date of Patent: Aug. 13, 2013

(54) SYSTEM AND METHOD FOR CONTROLLING VEHICLE

(75) Inventors: Gen Inoue, Susono (JP); Yasuhito Ishida, Toyokawa (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 706 days.

(21) Appl. No.: 12/223,579

(22) PCT Filed: Jun. 6, 2007

(86) PCT No.: PCT/IB2007/001489
§ 371 (c)(1),
(2), (4) Date: Aug. 4, 2008

(87) PCT Pub. No.: WO2007/141631
PCT Pub. Date: Dec. 13, 2007

(65) Prior Publication Data
US 2009/0037069 A1    Feb. 5, 2009

(30) Foreign Application Priority Data
Jun. 7, 2006    (JP) .................................. 2006-158035

(51) Int. Cl.
*B60T 8/24*    (2006.01)
(52) U.S. Cl.
USPC .............................................. 701/94; 477/34
(58) Field of Classification Search
USPC ....... 701/29, 51, 70, 78, 93, 94, 301; 477/98, 477/158, 906.34
See application file for complete search history.

(56) References Cited

U.S. PATENT DOCUMENTS

| | | | | |
|---|---|---|---|---|
| 4,748,564 A | * | 5/1988 | Matsuda | 701/79 |
| 5,278,764 A | * | 1/1994 | Iizuka et al. | 701/301 |
| 5,404,302 A | * | 4/1995 | Matsuda et al. | 701/71 |
| 5,731,977 A | * | 3/1998 | Taniguchi et al. | 701/96 |
| 5,980,000 A | | 11/1999 | Kolbe et al. | |
| 6,104,976 A | * | 8/2000 | Nakamura | 701/95 |
| 6,122,587 A | * | 9/2000 | Takahara et al. | 701/78 |
| 6,346,064 B1 | * | 2/2002 | Hada et al. | 477/171 |

(Continued)

FOREIGN PATENT DOCUMENTS

DE    44 21 565 A1    12/1995
DE    199 33 087 A1    1/2001

(Continued)

OTHER PUBLICATIONS

Office Action issued Jan. 25, 2012 in counterpart German Patent Application No. 11 2007 000 872.5 (with English translation).

*Primary Examiner* — Thomas Black
*Assistant Examiner* — Shardul Patel
(74) *Attorney, Agent, or Firm* — Oliff & Berridge, PLC

(57) ABSTRACT

A system for controlling a vehicle that controls driving force and braking force such that a vehicle speed is maintained at a target vehicle speed. More specifically, when the vehicle speed exceeds the target vehicle speed, the system for controlling a vehicle maintains the driving force at or above a predetermined value, and applies braking force to the vehicle such that the vehicle speed is maintained at the target vehicle speed. This provides the vehicle with sufficient driving force for uphill driving following the downhill driving, and thus to travel uphill without significant speed loss. In other words, the vehicle ascends the uphill road smoothly at an approximately constant speed.

19 Claims, 10 Drawing Sheets

(56) References Cited

U.S. PATENT DOCUMENTS

| | | | |
|---|---|---|---|
| 6,494,282 B1 * | 12/2002 | Hessmert et al. | 180/197 |
| 6,679,807 B2 * | 1/2004 | Kato et al. | 477/107 |
| 7,319,927 B1 * | 1/2008 | Sun et al. | 701/93 |
| 7,416,037 B2 * | 8/2008 | Huelser et al. | 180/65.28 |
| 7,561,954 B2 | 7/2009 | Aizawa et al. | |
| 2002/0107106 A1 * | 8/2002 | Kato et al. | 477/110 |
| 2002/0156557 A1 * | 10/2002 | Gras | 701/29 |
| 2003/0060961 A1 * | 3/2003 | Ishizu et al. | 701/93 |
| 2003/0236606 A1 * | 12/2003 | Lu et al. | 701/70 |
| 2004/0015279 A1 * | 1/2004 | Barron et al. | 701/37 |
| 2004/0093145 A1 * | 5/2004 | Tanimichi et al. | 701/93 |
| 2004/0129470 A1 | 7/2004 | Huelser et al. | |
| 2004/0138802 A1 * | 7/2004 | Kuragaki et al. | 701/70 |
| 2005/0085974 A1 * | 4/2005 | Hedman et al. | 701/51 |
| 2005/0124459 A1 * | 6/2005 | Ito | 477/43 |
| 2007/0150158 A1 | 6/2007 | Inoue et al. | |
| 2009/0150075 A1 * | 6/2009 | Watanabe et al. | 701/214 |

FOREIGN PATENT DOCUMENTS

| | | |
|---|---|---|
| DE | 10339666 A1 | 8/2003 |
| FR | 2 813 050 A1 | 2/2002 |
| JP | B2-2514461 | 4/1996 |
| JP | A-8-142714 | 6/1996 |
| JP | A-08-200111 | 8/1996 |
| JP | DE 100 06 780 C1 | 9/2001 |
| JP | A-2002-89314 | 3/2002 |
| JP | A-2003-092803 | 3/2003 |
| JP | A-2004-090679 | 3/2004 |
| JP | A-2005-47313 | 2/2005 |
| WO | WO 03/051663 A1 | 6/2003 |

* cited by examiner

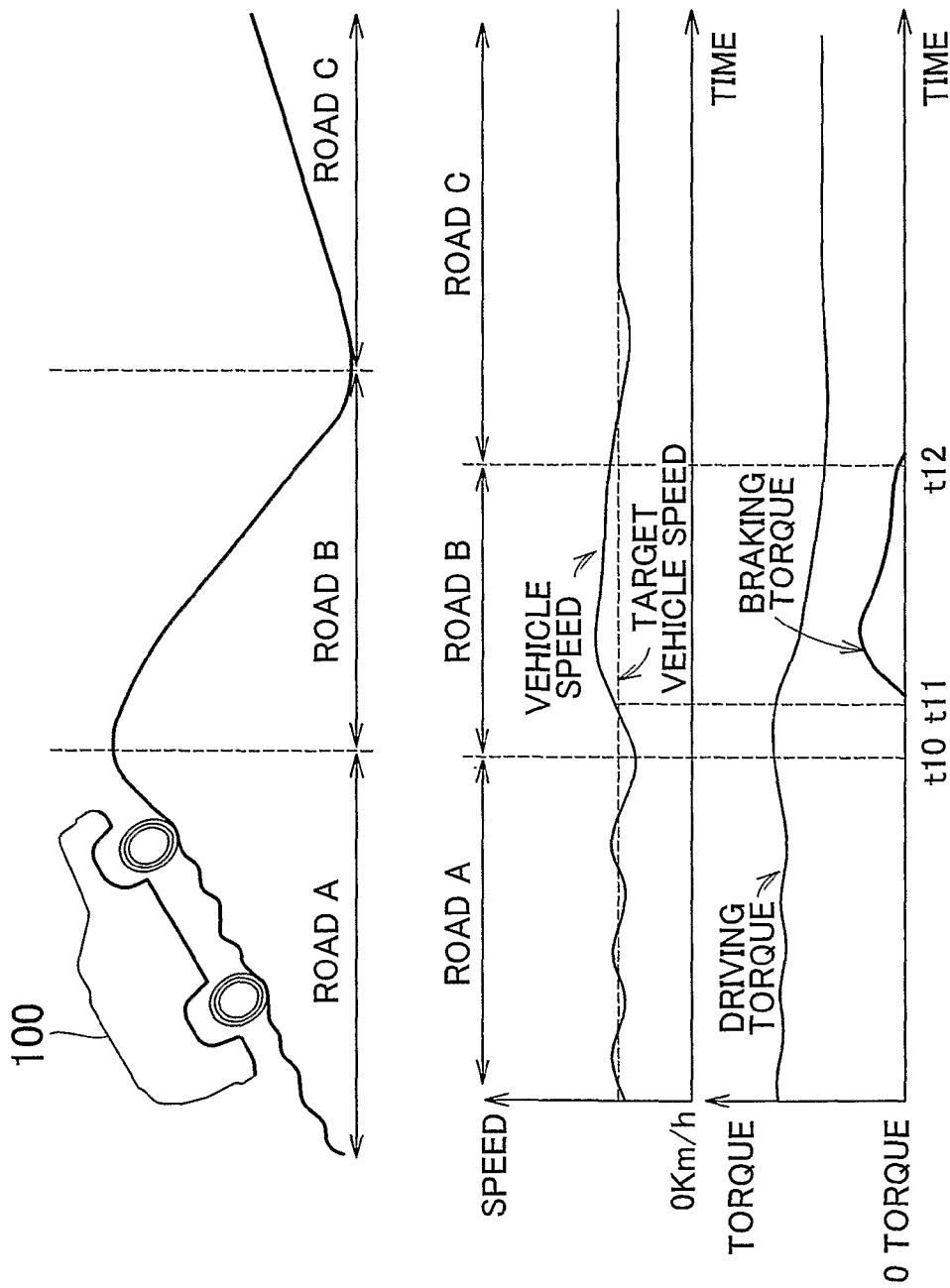

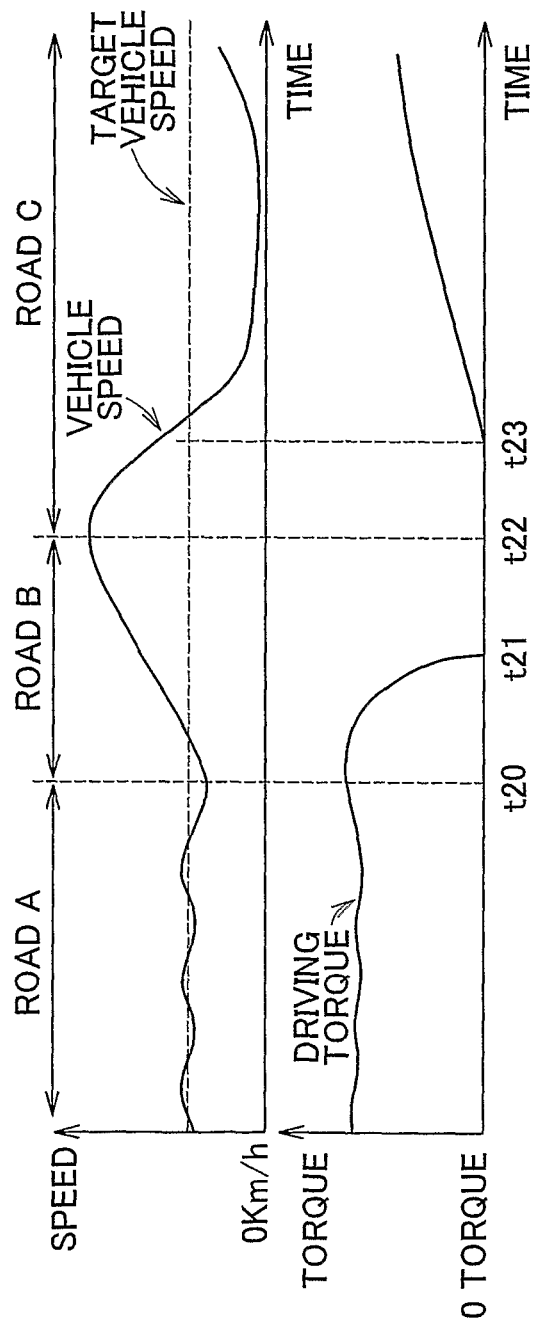

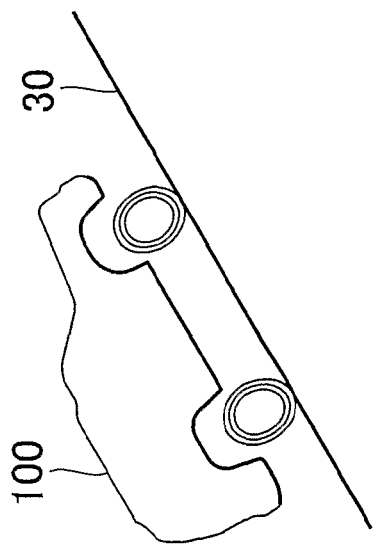
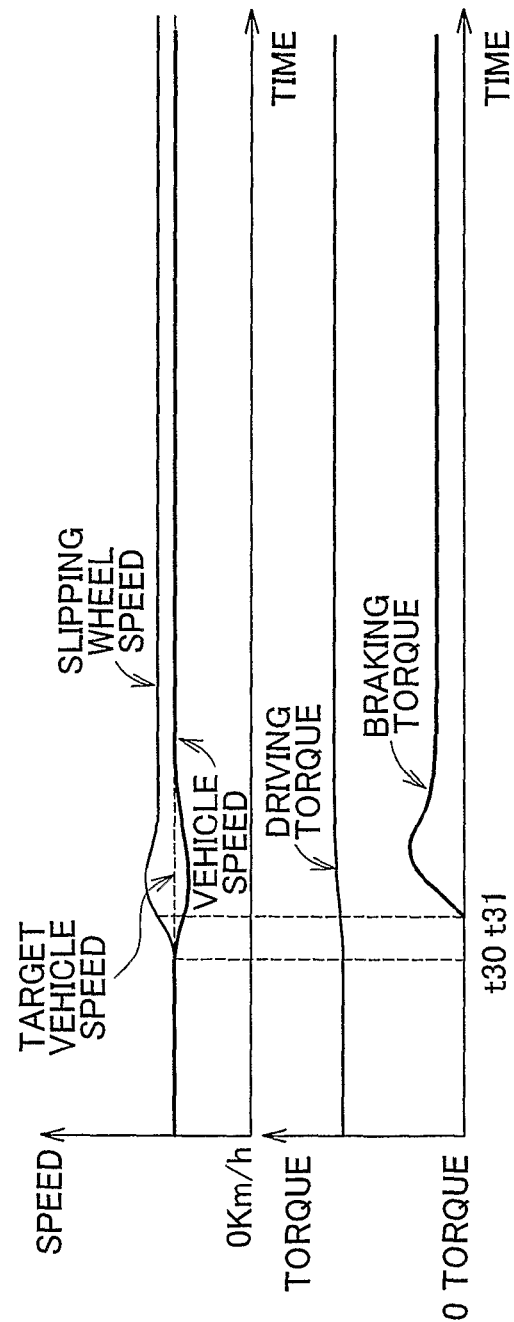
FIG. 3A
FIG. 3B
FIG. 3C

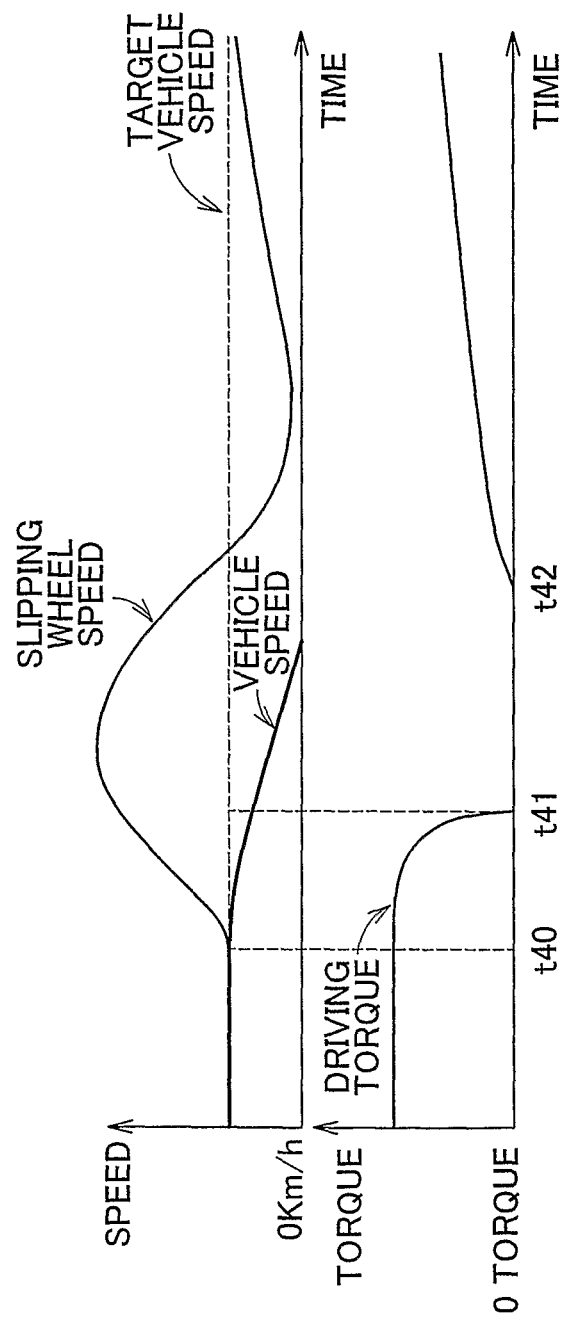

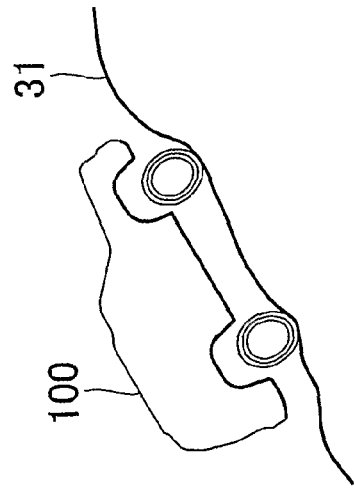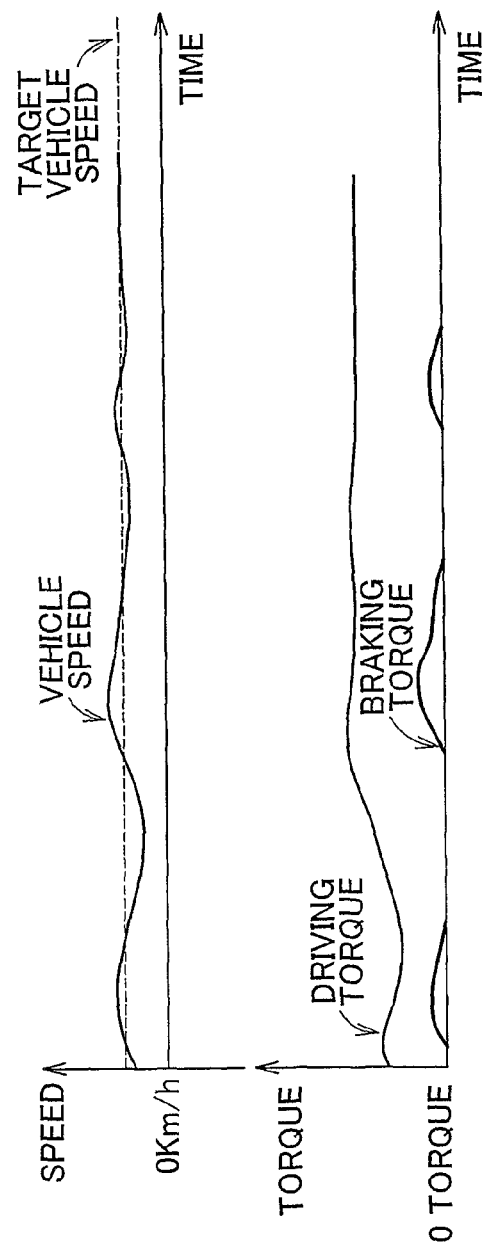
FIG. 4A
FIG. 4B
FIG. 4C

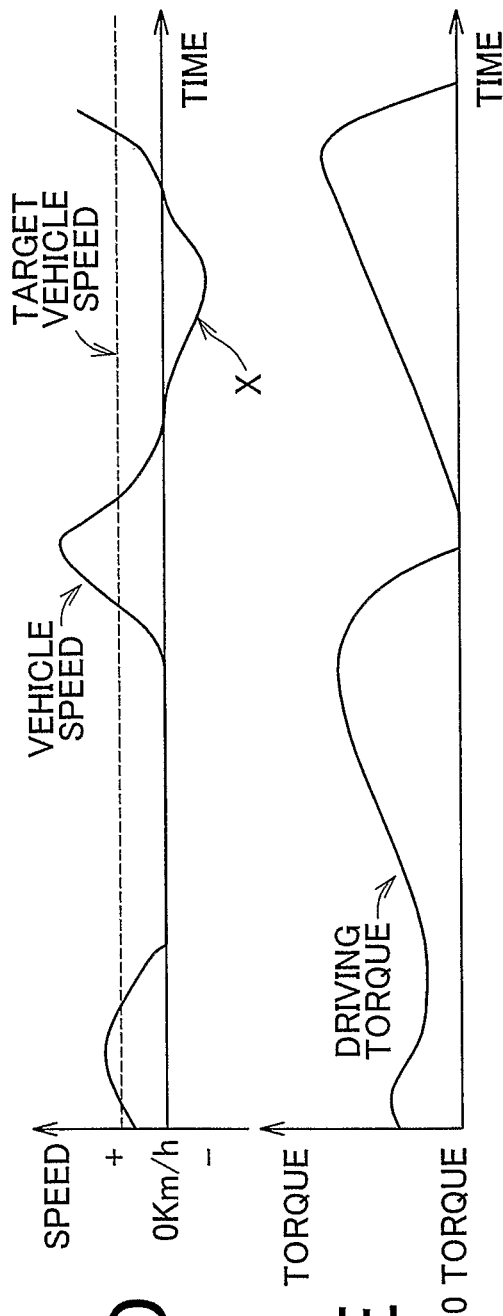

SYSTEM AND METHOD FOR CONTROLLING VEHICLE

BACKGROUND OF THE INVENTION

1. Field of the Invention

The present invention relates to a system and a method for controlling a vehicle, and more specifically, controlling driving force driving force and braking force to be applied to the vehicle.

2. Description of the Related Art

Conventional automatic cruise control systems generally control driving force and braking force to be applied to a vehicle such that a vehicle speed is maintained at a target vehicle speed, that is, the vehicle travels at a constant speed (See Japanese Patent Application Publication No. JP-B-2514461).

As described in Japanese Patent Application Publication No. JP-B-2514461, when the vehicle travels downhill, and thus the vehicle speed exceeds the target speed, the automatic cruise control system tends to executes the driving force control to reduce speed. Thus, when encountering a slope transition from downhill to uphill, the vehicle cannot immediately obtain driving force sufficient for an uphill ascent. It may take some time until the vehicle is ready for uphill driving. Hence, the aforementioned automatic cruise control system has a difficulty in maintaining the vehicle speed at the target speed when the vehicle transitions between traveling downhill to traveling uphill.

SUMMARY OF THE INVENTION

The present invention relates to a system and a method for controlling a vehicle, and more specifically, for controlling the vehicle speed by maintaining driving force and applying braking force such that the vehicle travels uphill properly.

According to a first aspect of the invention, a system for controlling a vehicle that controls the driving force and braking force to be applied to the vehicle such that a vehicle speed is maintained at a target vehicle speed, includes: driving force control means for applying driving force to the vehicle; braking force control means for applying braking force to the vehicle; and control means to control the driving force control means to maintain the driving force applied by the driving force control means at or above a predetermined value when the vehicle speed exceeds the target vehicle speed, and for controlling the braking force control means to apply the braking force from the braking force control means such that the vehicle speed is maintained at the target vehicle speed.

The system for controlling a vehicle allows the vehicle to ensure driving force sufficient for uphill driving following the downhill driving. The vehicle thus uses this driving force to ascend uphill properly without significant speed loss. In other words, the vehicle travels uphill smoothly, at an approximately constant speed.

In the system for controlling a vehicle, the control means may maintain the driving force applied by the driving force control means at a first driving force that is a level such that at least the vehicle maintain the same position on an uphill incline without applying the brake force. This ensures that the vehicle ascends the uphill following a downhill descent.

The control means may maintain the driving force applied by the driving force control means at a sum of the first driving force and a second driving force determined based on the target vehicle speed.

In the system for controlling a vehicle, when a wheel speed exceeds a target wheel speed, the control means may apply the braking force to any of wheels whose speed exceeds the target wheel speed. This allows application of braking force only to any slipping wheel, thereby reducing the wheel slip to effectively keep the vehicle speed constant.

In the system for controlling a vehicle, only when the wheel speed exceeds the target wheel speed by at least a certain amount, does the control means apply the braking force to the wheels. This reduces the frequency and duration to apply braking force to the wheels, thereby reducing load on brakes.

In the system for controlling a vehicle, the target wheel speed may be determined based on the vehicle speed or the target vehicle speed whichever is lower. This allows application of braking force to the wheels even in a low vehicle speed range relative to the target vehicle speed.

According to a second aspect of the invention, a method for controlling a vehicle, which controls the driving force and braking force to be applied to the vehicle such that a vehicle speed is maintained at a target vehicle speed, includes: maintaining the driving force applied to the vehicle at or above a predetermined value when a vehicle speed exceeds a target vehicle speed; and applying the braking force to the vehicle such that the vehicle speed is maintained at the target vehicle speed.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIGS. 2A to 2E show one example where the vehicle travels through a slope transition from downhill to uphill and the results from the example.

FIGS. 3A to 3E show one example where the vehicle travels on a slippery uphill road and the results from the example.

FIGS. 4A to 4E show one example where the vehicle travels on an un-even uphill road and the results from the example.

DETAILED DESCRIPTION OF THE EXEMPLARY EMBODIMENTS

An example embodiment of the invention is described below with reference to accompanying drawings.

A general configuration of a vehicle 100, equipped with a system for controlling a vehicle according to the embodiment of the invention, is described with reference to FIG. 1.

Figure 1:
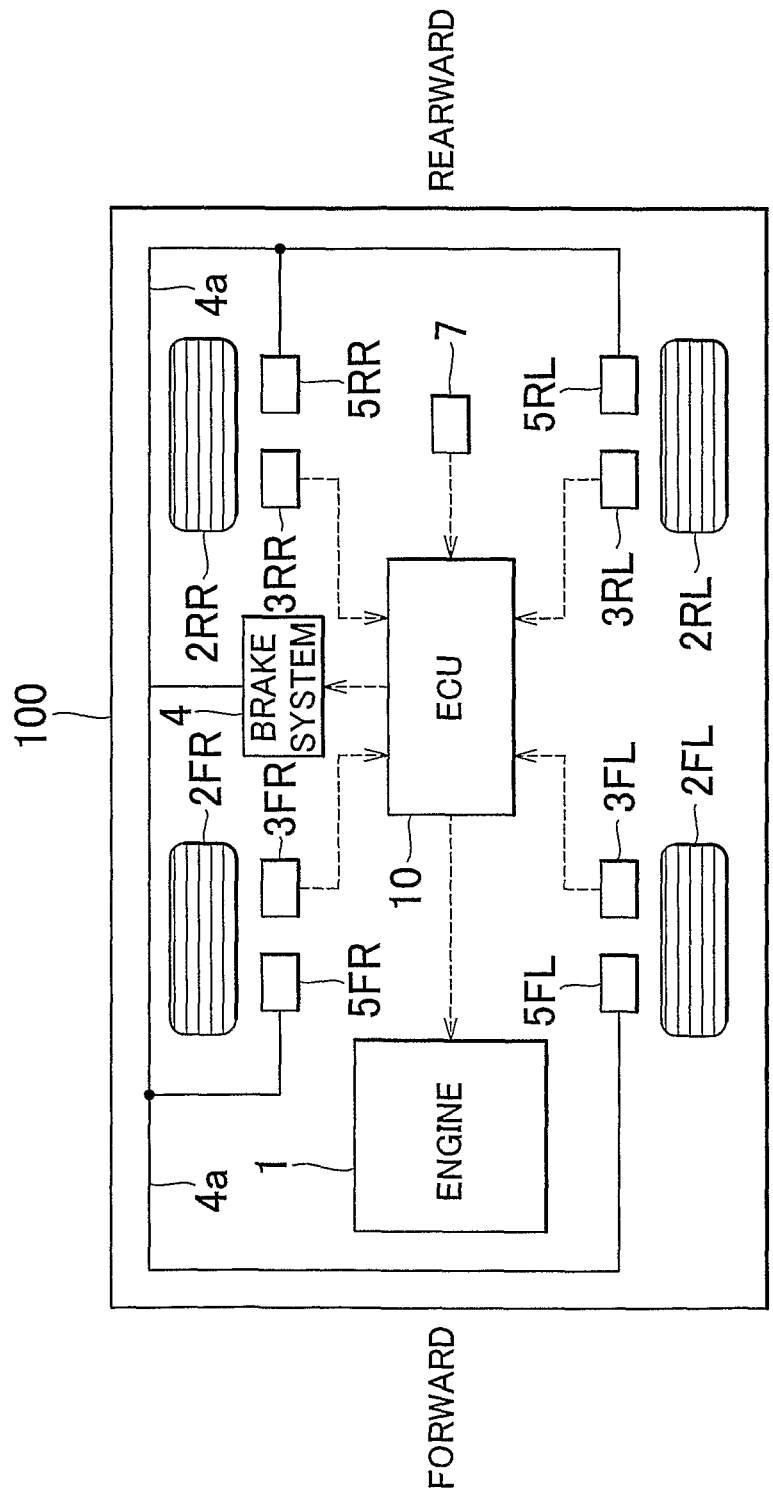
FIG. 1 is a schematic diagram illustrating a general configuration of a vehicle equipped with a system for controlling a vehicle according to an embodiment of the invention.

FIG. 1 is a schematic diagram of the general configuration of the vehicle 100. The left side in FIG. 1 indicates the forward direction of the vehicle 100, while the right side in FIG. 1 indicates the rearward direction of the vehicle 100. The dotted arrows in FIG. 1 indicate signal inputs/outputs.

Main components of the vehicle 100 include an engine (internal combustion engine) 1, wheels 2FR, 2FL, 2RR, 2RL, wheel speed sensors 3FR, 3FL, 3RR, 3RL, a brake system 4, a hydraulic path 4a, brakes 5FR, 5FL, 5RR, 5RL, an acceleration sensor (G sensor) 7, and an electronic control unit (ECU) 10. The wheels 2FR, 2FL are hereinafter referred to as "front wheels 2FR, 2FL." The wheels 2RR, 2RL are hereinafter referred to as "rear wheels 2RR, 2RL." In addition, these wheels 2FR, 2FL, 2RR, 2RL are collectively called simply "wheels 2" unless otherwise specified as either front, rear, left, or right.

The engine 1 is an internal combustion engine that generates power through combustion of a fuel air mixture in a combustion chamber. The power generated in the engine 1 is transmitted to at least any of the front wheels 2FR, 2FL and the rear wheels 2RR, 2RL via a torque converter, a transmission, and a drive shaft (not shown). In the engine 1, production of driving force (driving torque) is controlled based on a control signal provided from the ECU 10, which will be described later.

The wheel speed sensors 3FR, 3FL, 3RR, 3RL are designed to detect respective rotational speeds of the wheels 2FR, 2FL, 2RR, 2RL (hereinafter sometimes referred to as "wheel speed"). The wheel speed sensors 3FR, 3FL, 3RR, 3RL each send a signal to the ECU 10 indicating the detected wheel speed. The acceleration sensor 7 detects the acceleration of the vehicle 100 as well as the gradient of a slope (slope angle). The acceleration sensor 7 sends signals to the ECU 10 indicating the respective detected values.

The brake system 4 is a hydraulic brake system. The brake system 4 has a master cylinder and a hydraulic unit (both are not shown), and is connected to the brakes 5FR, 5FL, 5RR, 5RL through the hydraulic path 4a. The brake system 4 is regulated based on a control signal provided from the ECU 10. The brakes 5FR, 5FL, 5RR, 5RL are friction brakes, such as drum brake and disk brake. The brakes 5FR, 5FL, 5RR, 5RL are hydraulically actuated by oil delivered from the brake system 4 through the hydraulic path 4a to apply braking force (hereinafter sometimes referred to as "braking torque") to the respective wheels 2FR, 2FL, 2RR, 2RL. In this case, the brakes 5FR, 5FL, 5RR, 5RL apply braking torque to the associated wheels 2FR, 2FL, 2RR, 2RL in response to a value of hydraulic pressure produced by the brake system 4. The mechanism for applying braking torque to the vehicle 100 is not limited to the hydraulic brake system 4.

The ECU 10 includes a central processing unit (CPU), a read only memory (ROM) and a random access memory (RAM), which are not shown. According to the embodiment of the invention, the ECU primarily controls driving/braking torque that is applied to the vehicle 100 such that the vehicle speed is maintained at the target vehicle speed. More specifically, the ECU 10 calculates a speed of the vehicle 100 (vehicle speed) based on the wheel speeds provided by the wheel speed sensors 3FR, 3FL, 3RR, 3RL. According to the calculated vehicle speed and the target vehicle speed, the ECU 10 controls driving torque and braking torque to be applied to the vehicle 100. For example, the ECU 10 controls driving torque by means of varying the opening degree of a throttle valve (not shown). In turn, the ECU 10 controls braking torque by means of regulating the brake system 4. Hence, the ECU 10 functions as a system for controlling a vehicle in the invention.

A method for controlling driving torque/braking torque according to the embodiment of the invention will now be described.

The driving torque/braking torque control maintains a vehicle speed at a target vehicle speed. In other words, driving torque and braking torque are controlled such that the vehicle 100 travels at a constant target vehicle speed. Essentially, driving torque is controlled based on a deviation between the vehicle speed and the target vehicle speed. That is, the driving torque is controlled solely to maintain the vehicle speed at the target vehicle speed. In turn, braking torque is controlled to decrease the vehicle speed to a predetermined speed or lower.

According to the embodiment of the invention, under the driving torque/braking torque control, when the vehicle speed exceeds the target vehicle speed, the driving torque applied to the Vehicle 100 is maintained at or above a predetermined value (hereinafter sometimes refereed to as "predetermined driving torque"), and braking torque is applied to the vehicle 100 such that the vehicle speed is maintained at the target vehicle speed. In other words, when the vehicle speed exceeds the target vehicle speed, the ECU 10 controls or reduces the vehicle speed to the target vehicle speed and maintains the reduced speed. This is achieved by maintaining the driving torque at or above the predetermined value in combination with applying braking torque to the vehicle 100, rather than solely by decreasing the driving torque greatly.

Controlling driving torque/braking torque in such a manner allows the vehicle to ensure driving torque, which is equal to or greater than the predetermined value, for uphill driving following the downhill driving. The vehicle thus uses the driving torque to ascend uphill properly. To be more specific, the vehicle travels uphill smoothly at an approximately constant speed without significant speed loss after a downhill descent.

It should be noted that the predetermined driving torque may be equal to or greater than the driving torque needed to have the vehicle 100 travel uphill with no braking torque applied. For instance, this driving torque, such that the vehicle 100 travels uphill with no braking torque applied, is determined based on the gradient of the slope detected by the acceleration sensor 7. Alternatively, the predetermined driving torque may be equal to or greater than a sum of driving torque such that the vehicle 100 travels uphill with no braking torque applied, and driving torque determined based on the target vehicle speed. In this case, the driving torque, determined based on the target vehicle speed, is calculated in accordance with the relationship between a current engine speed and a target engine speed, which is obtained from the target vehicle speed. Controlling the driving torque to be maintained at or above such predetermined driving torque ensures that the vehicle 100 ascends uphill with minimal speed loss following a downhill descent.

A method for controlling driving torque/braking torque according to the embodiment of the invention will be described in detail below. The ECU 10 executes this control.

FIGS. 2A to 2E show a first example where the vehicle travels through a slope transition from downhill to uphill. As shown in FIG. 2A, a road A is an uphill slope, a road B is a downhill slope, and a road C is an uphill slope.

FIGS. 2B and 2C show results obtained from the control according to the embodiment of the invention. FIGS. 2D and 2E show results obtained from a comparative control. Under the control according to the embodiment, when a vehicle speed exceeds a target vehicle speed, the driving torque applied to the vehicle 100 is maintained at or above a predetermine value, and braking torque is applied to the vehicle 100 such that the vehicle speed is maintained at the target vehicle speed. In contrast, under the comparative control, when the vehicle speed exceeds the target vehicle speed, only the driving torque applied to the vehicle 100 is adjusted to maintain the vehicle speed at the target vehicle speed. In other words, under the comparative control, essentially no braking torque control is performed to maintain the vehicle speed at the target vehicle speed.

More specifically, FIGS. 2B and 2D both show fluctuations in vehicle speed. Also, FIG. 2C shows respective fluctuations in driving torque and braking torque. FIG. 2E shows fluctuations in driving torque. The horizontal axes in FIGS. 2B to 2E represent time. The vehicle speeds shown in FIGS. 2B and 2D approximately match the respective wheel speeds.

With reference to FIGS. 2B and 2C, the results from the control according to the embodiment of the invention will now be described. As shown in FIG. 2B, the vehicle 100 starts traveling downhill on road B at time t10. At time t11, after the vehicle starts traveling downhill on road B for a certain amount of time, the vehicle speed exceeds the target vehicle speed. Concurrently, the ECU 10 starts applying braking torque to the vehicle 100, as shown in FIG. 2C. The ECU 10 also controls the driving torque to be maintained at or above the predetermined value. To be more specific, while maintaining the driving torque at or above the predetermined value, the ECU 10 controls the braking torque to be applied to the vehicle 100 such that the vehicle speed is maintained at the target vehicle speed. This prevents the vehicle speed from increasing excessively, maintaining the vehicle speed approximately at the target vehicle speed during the vehicle driving on the road B, as seen from FIG. 2B.

At time t12, the vehicle 100 starts traveling uphill on road C following the road B. In this case, the vehicle 100 promptly travels uphill on road C with the vehicle speed maintained approximately at the target vehicle speed (i.e. the vehicle speed remains almost unchanged), as seen from FIG. 2B. The reason for this is that at least the predetermined driving torque is maintained when the vehicle reaches the end of road B. In other words, because the driving torque equal to or greater than the required torque for ascending road C is maintained, the vehicle uses the driving torque to travel on road C smoothly. After the time t12, the vehicle speed decreases from the target vehicle speed slightly. Thus, the ECU 10 stops applying braking torque to the vehicle 100.

With reference to FIGS. 2D and 2E, the results from the comparative control will now be described. As shown in FIG. 2D, the vehicle 100 starts traveling downhill on road B at time t20. In this case, the vehicle speed increases as the vehicle 100 descends road B. Thus, the driving torque is reduced to prevent such an increase in vehicle speed. Under this condition, the driving torque is reduced sharply to "0" at time t21. The driving torque remains "0" during the transition from road B to road C, and accordingly, no driving torque is applied to the vehicle 100 when it starts traveling uphill on road C. This results in a sharp decrease in vehicle speed.

Then, at around time t23, the vehicle speed decreases from the target vehicle speed, and thus driving torque is reapplied to the vehicle 100. Under this condition, the driving torque increases so moderately that the vehicle speed continues to decrease for a brief time before the vehicle speed increases again. The reason for this is that the driving torque control is usually achieved by adjusting the opening degree of the throttle valve, and thus there tends to be a lag between when the driving torque is required and when the throttle valve responds. Another reason is that a feedback control gain, which depends on the deviation between the vehicle speed and the target vehicle speed, is preset relatively smaller than usual in order to prevent hunting of the control of the throttle valve.

Hence, relative to the comparative control, the embodiment of the present invention allows the vehicle 100 to ascend uphill more smoothly with the vehicle speed maintained approximately at the target vehicle speed when the vehicle travels through the slope transition from downhill to uphill. In other words, according to the embodiment of the invention, the vehicle travels uphill smoothly at an approximately constant speed without significant speed loss after a downhill descent.

FIGS. 3A to 3E are views for describing the second example where the vehicle travels on a slippery uphill road on which any of the wheels 2 may slip. A road 30 in FIG. 3A is an uphill slope. Only a part of the surface of the road 30, on which either the right-side wheels (2FR, 2RR) or the left-side wheels (2FL, 2RL) pass, has a low road friction coefficient, μ.

FIGS. 3B and 3C show results obtained from the control according to the embodiment of the invention. FIGS. 3D and 3E show results obtained from a comparative control similar to the above example. FIGS. 3B and 3D show fluctuations in speed, in which a thick line represents a vehicle speed, while a thin line represents a speed of the slipping wheels 2 (slipping wheel speed). FIG. 3C shows fluctuations in driving torque and braking torque. FIG. 3E shows fluctuations in driving torque. The horizontal axes in FIGS. 3B to 3E represent time.

With reference to FIGS. 3B and 3C, the results from the control according to the embodiment of the invention will now be described. As shown in FIG. 3B, at time t30, the vehicle speed decreases from the target vehicle speed, while the slipping wheel speed exceeds the target vehicle speed. In other words, the wheel speed in excess of the vehicle speed causes the vehicle 100 to slip. Under this condition, at time t31, while maintaining the driving torque at or above a predetermined value, the ECU 10 starts applying braking torque to the slipping wheels 2, so that the vehicle speed is maintained at the target vehicle speed. Thus, as shown in FIG. 3B, at or after the time t31, the slipping wheel speed is prevented from increasing and kept almost constant, and simultaneously the vehicle speed is maintained at the target vehicle speed. In other words, the embodiment of the invention allows the vehicle to travel smoothly on the slippery road 30 at an approximately constant speed.

With reference to FIGS. 3D and 3E, the results from the comparative control will now be described. In FIG. 3D, a slip of the vehicle 100 is found at time t40. At this time, the driving torque is reduced to minimize any increase in wheel speed due to the slip. The driving torque is thus reduced to "0" at time t41 as shown in FIG. 3E. Under this condition, the vehicle speed and the slipping wheel speed both decrease. Then, at time t42, driving torque is reapplied to the vehicle. In this case, the driving torque is slowly increased so that the vehicle speed and the slipping wheel speed are not increased immediately.

Hence, relative to the comparative control, the embodiment of the invention allows the vehicle to travel on the slippery road 30 more smoothly at an approximately constant speed without significant speed loss, while appropriately preventing vehicle slip.

FIGS. 4A to 4E are views for describing the third example where the vehicle travels on an un-even uphill road. A road 31 in FIG. 4A is an uphill slope and the road surface has plural bumps.

FIGS. 4B and 4C show the results obtained from the control according to the embodiment of the invention. FIGS. 4D and 4E show results obtained from the comparative control similar to the above examples. FIGS. 4B and 4D both show fluctuations in vehicle speed. FIG. 4C shows respective fluctuations in driving torque and braking torque. FIG. 4E shows fluctuations in driving torque. The horizontal axes in FIGS. 4B to 4E represent time.

With reference to FIGS. 4B and 4C, the results from the control according to the embodiment of the invention will now be described. When the vehicle 100 passes over a bump, a vehicle speed tends to increase and exceed a target vehicle speed. When this happens, the ECU 10 maintains the driving torque at or above a predetermined value, while applying braking torque to the vehicle 100 such that the vehicle speed is maintained at the target vehicle speed, as shown in FIGS. 4B and 4C. It is thus understood that the vehicle 100 drives through the road 31 with the driving torque maintained at or above the predetermined value as well as with the vehicle speed maintained at the target vehicle speed. In other words, according to the embodiment of the invention, even if the vehicle encounters another bump on the road or uphill slope immediately after passing over the bump, the vehicle ascends uphill at an approximately constant speed without significant speed loss.

With reference to FIGS. 4D and 4E, the results from the comparative control will now be described. As shown in FIGS. 4D and 4E, when the vehicle 100 passes over a bump, the driving torque is reduced to minimize an increase in vehicle speed. At the point X shown by the arrow in FIG. 4D, backward rolling or slip of the vehicle 100 occurs when the vehicle 100 encounters another bump immediately after passing over the bump. The reason for this is that the driving torque, which was reduced when the vehicle passed over the bump, has not recovered sufficiently for passing over another bump.

Hence, relative to the comparative control, the embodiment of the invention allows the vehicle to travel on the un-even road 31 more smoothly at an approximately constant speed, while preventing the vehicle 100 from backward rolling or slipping.

A process for controlling driving torque/braking torque according to the embodiment of the invention will now be described. The process executes an engine FB control in accordance with the relationship between a vehicle speed and a target vehicle speed, and a brake FB control in accordance with the relationship between a wheel speed and a BRK speed limit. More specifically, under the engine FB control, the driving torque is reduced when the vehicle speed is equal to or higher than the target vehicle speed, while the driving torque is increased when the vehicle speed is lower than the target value. In turn, under the brake FB control, the braking torque is increased when the wheel speed is equal to or higher than the BRK speed limit, while the braking torque is reduced when the wheel speed is lower than the BRK speed limit.

The BRK speed limit, used for the brake FB control, is determined in accordance with either lower one of the vehicle speed and the target vehicle speed. To be more specific, the BRK speed limit is obtained by adding a constant K the lower of either the vehicle speed or the target vehicle speed. For example, the constant K is lower relative to the target vehicle speed. Executing the brake FB control using the BRK speed limit thus determined allows application of braking torque to the wheels 2 even in a low vehicle speed range relative to the target vehicle speed. In other words, the vehicle obtains appropriate limited slip differential (LSD) effect. It should be noted that the BRK speed limit is one of the examples of a "target wheel speed" in the invention.

Figure 5:
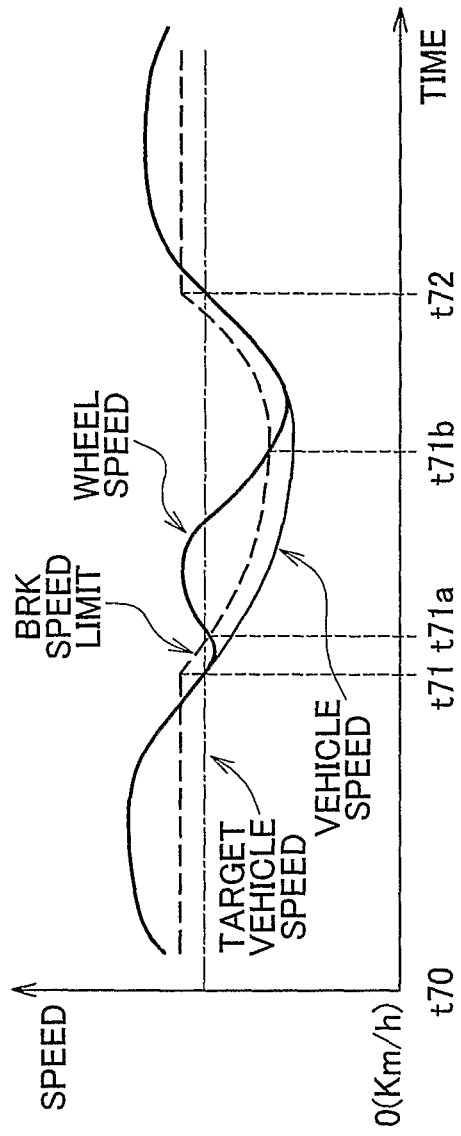
FIG. 5 is a graph that describes a brake FB control using a BRK speed limit.

With reference to FIG. 5, the brake FB control using the BRK speed limit will now be described. In FIG. 5, the horizontal axis represents time, while the vertical axis represents speed. The vehicle speed is higher than the target vehicle speed between time t70 and time t71, and thus the constant K is added to the target vehicle speed to obtain the BRK speed limit. The vehicle speed is lower than the target vehicle speed between time t71 and time t72, and thus the constant K is added to the vehicle speed to obtain the BRK speed limit. At or after the time t72, the vehicle speed is higher than the target vehicle speed, and thus the constant K is added to the target vehicle speed to obtain the BRK speed limit. In this case, the wheel speed exceeds the BRK speed limit between time t71a and time t71b. Thus, in order to decrease the wheel speed, the ECU 10 applies braking torque to any of the wheels 2, whose speed exceeds the BRK speed limit.

Figure 6:
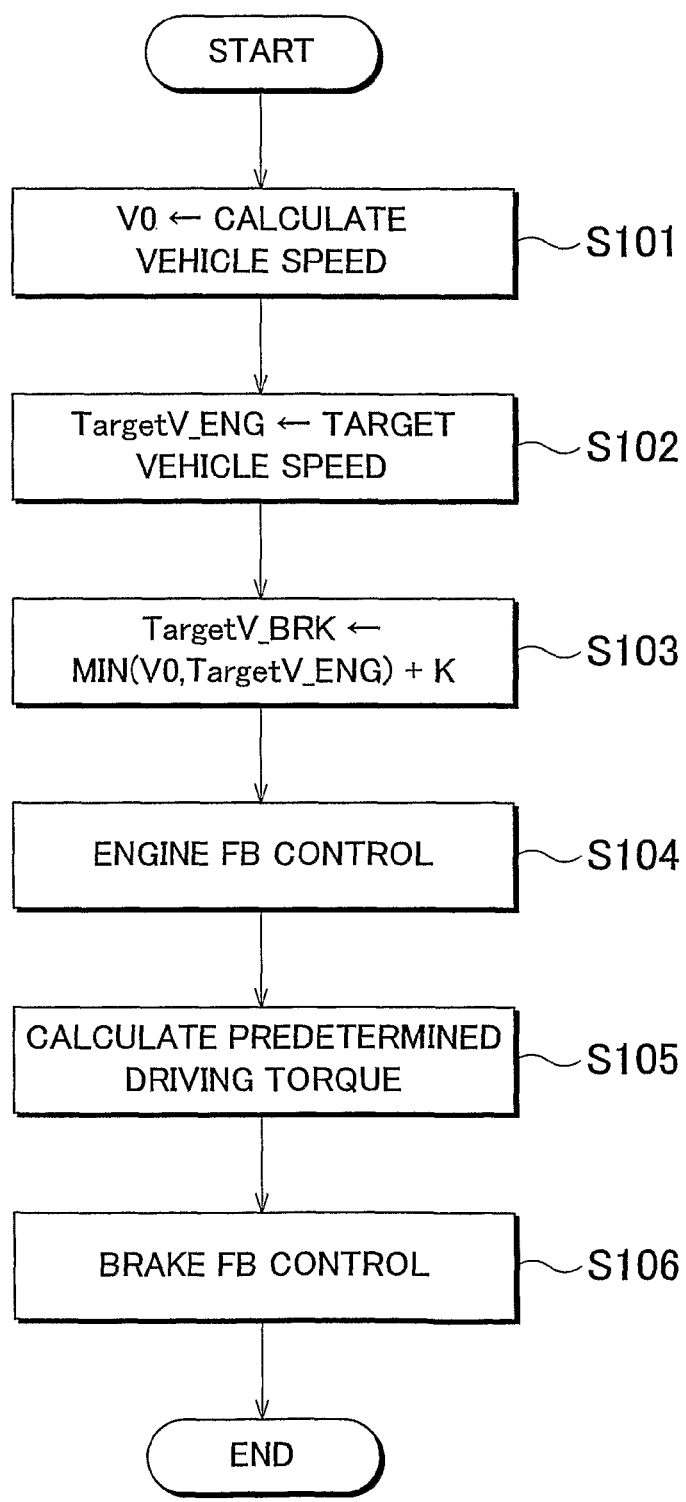
FIG. 6 is a flowchart of the process for controlling driving torque/braking torque according to the embodiment of the invention.

With reference to the flowchart in FIG. 6, a process for controlling driving torque/braking torque according to the embodiment of the invention will now be described. The ECU 10 repeats this process at given time intervals.

In step S101, the ECU 10 calculates a vehicle speed V0. More specifically, the ECU 10 acquires wheel speeds detected by the wheel speed sensors 3FR, 3FL, 3RR, 3RL, and calculates the vehicle speed V0 of the vehicle 100 based on the detected wheel speeds. The process goes to the step S102.

In step S102, the ECU 10 calculates a target vehicle speed, TargetV_ENG. In one example, the ECU 10 acquires a slope gradient detected by the acceleration sensor 7, and calculates the target vehicle speed, TargetV_ENG, based on the slope gradient. In another example where the vehicle 100 is provided with a switch for setting the target vehicle speed, TargetV_ENG, the ECU 10 determines the speed selected by the switch to be the target vehicle speed, TargetV_ENG. When the above step is completed, the process goes to the step S103.

In step S103, the ECU 10 calculates a BRK speed limit, TargetV_BRK. More specifically, the BRK speed limit, TargetV_BRK, is obtained by adding a constant K to the lower of either the vehicle speed V0 or the target vehicle speed, TargetV_ENG (MIN(V0, TargetV_ENG)). The process goes to the step S104.

In step S104, the ECU 10 executes the engine FB control in accordance with the relationship between the vehicle speed V0 and the target vehicle speed, TargetV_ENG. More specifically, the ECU 10 reduces the driving torque applied to the vehicle 100 when the vehicle speed V0 is equal to or higher than the target vehicle speed, TargetV_ENG, while increasing the driving torque applied to the vehicle 100 when the vehicle speed V0 is lower than the target vehicle speed, TargetV_ENG. The process goes to the step S105.

In step S105, the ECU 10 calculates a predetermined driving torque. More specifically, the ECU 10 calculates a vehicle driving torque (the predetermined driving torque) such that the vehicle 100 travels uphill with no braking torque applied. Also, the ECU 10 maintains the driving torque at or above the calculated value. It should be noted that the predetermined driving torque depends on the specifications of a vehicle, including weight. When the above step is completed, the process goes to the step S106.

In step S106, the ECU 10 executes the brake FB control in accordance with the relationship between the wheel speed and the BRK speed limit, TargetV_BRK. More specifically, the ECU 10 controls the braking torque to apply an increased braking torque to the wheels 2 when the wheel speed is equal to or higher than the BRK speed limit, TargetV_BRK. However, the ECU 10 controls the braking torque to apply a decreased braking torque to the wheels 2 when the wheel speed is lower than the BRK speed limit, TargetV_BRK. When the above step is completed, the process goes through the flowchart.

The aforementioned process for controlling driving torque/braking torque ensures that appropriate driving torque, which is equal to or greater than the predetermined value, is applied to the vehicle 100, and appropriate braking torque is applied to the vehicle 100, thereby maintaining the vehicle speed at the target vehicle speed. This allows the vehicle to travel uphill smoothly at an approximately constant speed without significant speed loss after a downhill descent.

In the aforementioned embodiment, braking torque is applied to the wheels 2 when the vehicle speed exceeds the target vehicle speed (e.g. when the wheel speed exceeds the BRK speed limit). However, the invention is not limited to this embodiment. Alternatively, braking torque may only be applied to any of the wheels 2, whose speed is higher than the target wheel speed by at least a certain amount. Effecting the braking torque control in this manner results in reductions in number of times and duration to apply braking torque to the wheels, thereby reducing the load on the brakes 5FR, 5FL, 5RR, 5RL.

Figures 7A, 7B:
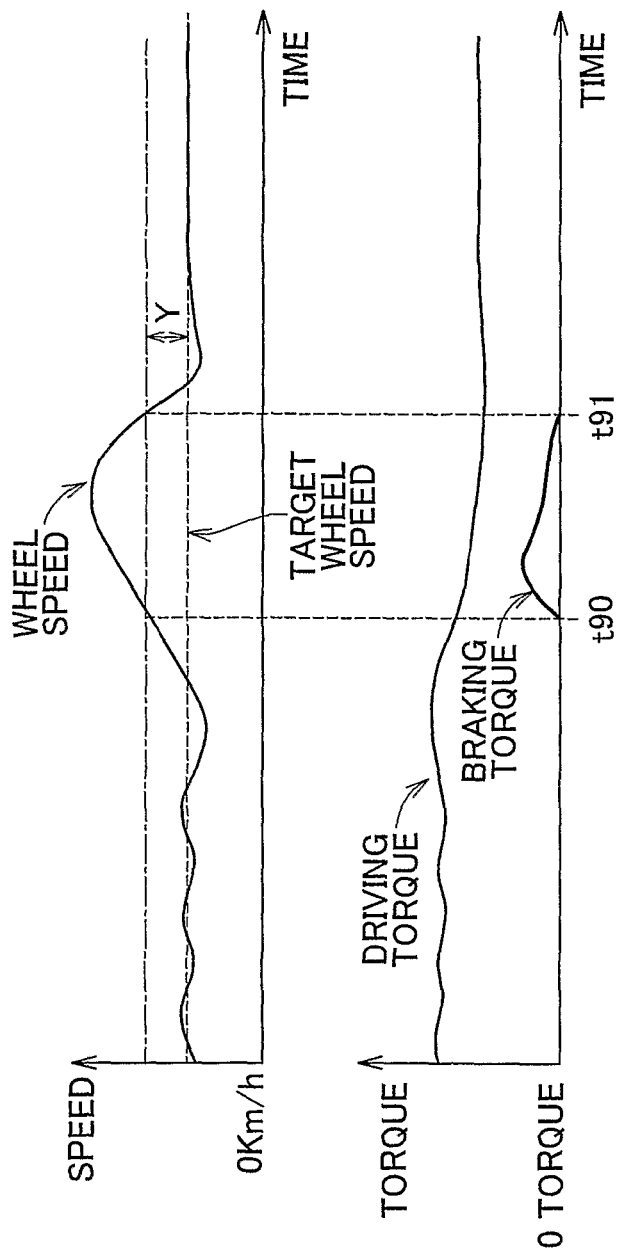
FIGS. 7A and 7B are graphs that describe a control method in a variation of the above embodiment.

The control method according to the variation is described with reference to FIGS. 7A and 7B. The aforementioned ECU 10 also executes this control according to the variation. FIG. 7A shows a wheel speed and a target wheel speed. FIG. 7B shows driving torque and braking torque. The horizontal axes in FIGS. 7A and 7B represent time. As one of examples, the target wheel speed is set at a constant value.

In this variation, the wheel speed is higher than the target wheel speed by at least a certain amount Y between time t90 and time t91. Accordingly, the ECU 10 controls the braking torque to be applied to any of the wheels 2, whose speed is higher than the target wheel speed by at least the certain amount Y between time t90 and time t91. This properly prevents the wheels 2 from slipping, thereby keeping the wheel speed and the vehicle speed approximately constant, and reducing the load on the brakes, 5FR, 5FL, 5RR, 5RL.

The invention claimed is:

1. A system for controlling a vehicle comprising:
a control unit that maintains a driving force applied to the vehicle at or above a predetermined value when a vehicle speed exceeds a target vehicle speed and the control unit applies a braking force to the vehicle, while maintaining the driving force applied to the vehicle, such that the vehicle speed is maintained at the target vehicle speed, wherein
the predetermined value of the driving force is determined based on a gradient of a slope on which the vehicle travels,
the predetermined value is set to at least a level such that the vehicle travels along an uphill incline with no brake force applied, and
the predetermined value is based on a driving force detected during prior uphill driving, and the control unit maintains the detected driving force during downhill driving at least until the vehicle again ascends uphill.

2. The system for controlling a vehicle according to claim 1, wherein the predetermined value is further determined based on the target vehicle speed.

3. The system for controlling a vehicle according to claim 1, further comprising:
a sensor for detecting the gradient of the slope on which the vehicle travels,
wherein the predetermined value is determined based on the gradient of the slope detected by the sensor.

4. The system for controlling a vehicle according to claim 2, wherein the driving force is calculated in accordance with the relationship between a current engine speed and a target engine speed, the target engine speed being obtained from the target vehicle speed.

5. The system for controlling a vehicle according to claim 1, wherein when a wheel speed exceeds a target wheel speed, the control unit applies the braking force to the wheel whose speed exceeds the target wheel speed.

6. The system for controlling a vehicle according to claim 1, wherein when a wheel speed exceeds a target wheel speed by at least a prescribed amount, the control unit applies the braking force to the wheels.

7. The system for controlling a vehicle according to claim 5, wherein the target wheel speed is determined based on the lower of either the vehicle speed or the target vehicle speed.

8. A method for controlling a vehicle comprising:
maintaining a driving force applied to the vehicle at or above a predetermined value when a vehicle speed exceeds a target vehicle speed; and
applying braking force to the vehicle, while maintaining the driving force applied to the vehicle, such that the vehicle speed is maintained at the target vehicle speed, wherein
the predetermined value of the driving force is determined based on a gradient of a slope on which the vehicle travels,
the predetermined value is set to at least a level such that the vehicle travels along an uphill incline with no brake force applied, and
the predetermined value is based on a driving force detected during prior uphill driving, and the control unit maintains the detected driving force during downhill driving at least until the vehicle again ascends uphill.

9. The method for controlling a vehicle according to claim 8, wherein the predetermined value is further determined based on the target vehicle speed.

10. The method for controlling a vehicle according to claim 8, further comprising:
detecting the gradient of the slope on which the vehicle travels,
wherein the predetermined value is determined based on the detected gradient.

11. The method for controlling a vehicle according to claim 9, wherein the driving force, determined based on the target vehicle speed, is calculated in accordance with the relationship between a current engine speed and a target engine speed, wherein the target engine speed is obtained from the target vehicle speed.

12. The method for controlling a vehicle according to claim 8, wherein when a wheel speed exceeds a target wheel speed, the braking force is applied to the wheel whose speed exceeds the target wheel speed.

13. The method for controlling a vehicle according to claim 8, wherein when a wheel speed exceeds a target wheel speed by at least a prescribed amount, the braking force is applied to the wheel.

14. The method for controlling a vehicle according to claim 12, wherein the target wheel speed is determined based on the lower of either the vehicle speed or the target vehicle speed.

15. The system for controlling a vehicle according to claim 1, wherein the vehicle is provided with a switch for setting the target speed.

16. The method for controlling a vehicle according to claim 8, wherein the target vehicle speed is set via a switch provided in the vehicle.

17. The system for controlling a vehicle according to claim 1, wherein when the vehicle speed exceeds a target speed during downhill driving, the control unit maintains the driving force that was applied to the vehicle during prior uphill driving to maintain the vehicle speed to the target speed.

18. A system for controlling a vehicle comprising:
a control unit that maintains a driving force applied to the vehicle at or above a predetermined value when a vehicle speed exceeds a target vehicle speed and the control unit applies a braking force to the vehicle, while maintaining the driving force applied to the vehicle, such that the vehicle speed is maintained at the target vehicle speed, wherein the predetermined value of the driving force is equal to the sum of a first driving force and a second driving force, the first driving force is set to at least a level such that the vehicle travels along an uphill incline with no brake force applied, the second driving force is determined based on the target vehicle speed, and the control unit uses data collected from prior uphill driving to calculate the first driving force and maintains the predetermined value during downhill driving at least until the vehicle again ascends uphill.

19. The system for controlling a vehicle according to claim 18 further comprising a brake control unit configured to apply a braking torque to an individual wheel based on the respective wheel speed, wherein a target wheel maximum speed is calculated such that, (a) if the vehicle speed is greater than the target vehicle speed, the maximum speed is equal to the sum of a constant and the target vehicle speed; and (b) if the vehicle speed is less than the target vehicle speed, the maximum speed is equal to the sum of a constant and the vehicle speed, and when the wheel speed exceeds the maximum speed, the control unit applies the braking torque to the respective wheel.

* * * * *